US00RE49001E

(19) United States
(12) Reissued Patent
Xiao et al.

(10) Patent Number: US RE49,001 E
(45) Date of Reissued Patent: Mar. 29, 2022

(54) DYNAMIC SELECTION OF A RECEIVE ANTENNA PATTERN

(71) Applicant: ARRIS Enterprises, LLC, Suwanee, GA (US)

(72) Inventors: Shuai Xiao, Sunnyvale, CA (US); Chonggang Li, San Jose, CA (US); Huaqing Zeng, Fremont, CA (US); Michael Ren, Sunnyvale, CA (US)

(73) Assignee: ARRIS Enterprises LLC, Suwanee, GA (US)

(21) Appl. No.: 16/796,779

(22) Filed: Feb. 20, 2020

Related U.S. Patent Documents

Reissue of:
(64) Patent No.: 10,374,685
Issued: Aug. 6, 2019
Appl. No.: 15/432,868
Filed: Feb. 14, 2017

(51) Int. Cl.

| | |
|---|---|
| ***H04B 15/00*** | (2006.01) |
| ***H04B 7/08*** | (2006.01) |
| ***H04W 72/04*** | (2009.01) |
| ***H04W 72/08*** | (2009.01) |
| ***H04W 84/12*** | (2009.01) |

(Continued)

(52) U.S. Cl.
CPC ..... *H04B 7/086* (2013.01); *H04B 7/088* (2013.01); *H04W 72/046* (2013.01); *H04W 74/0816* (2013.01); *H04W 84/12* (2013.01); *H04W 88/08* (2013.01)

(58) Field of Classification Search
CPC combination set(s) only.
See application file for complete search history.

(56) References Cited

U.S. PATENT DOCUMENTS 6,320,538 B1 * 11/2001 Lalezari ..... H01Q 3/267 342/368
6,944,433 B2 * 9/2005 Ogino ..... H01Q 1/244 343/702
9,621,250 B2 * 4/2017 Waz-Ambrozewicz ..... H04B 7/0695

(Continued)

FOREIGN PATENT DOCUMENTS

WO WO 2017/082941 * 5/2017 ..... H04B 7/0811

OTHER PUBLICATIONS

Third Examination Report, European Patent Appl. No. 18156763.7, May 12, 2020.

(Continued)

*Primary Examiner* — Robert L Nasser
(74) *Attorney, Agent, or Firm* — Steven Stupp

(57) ABSTRACT

An access point that performs dynamic selection of an electronic-device-specific receive antenna pattern of an antenna for use when receiving a frame from an electronic device in a WLAN is described. In particular, during operation the access point may determine the receive antenna pattern of the antenna that is used when receiving the frame from the electronic device. Then, the access point may store, in memory, information that specifies the receive antenna pattern. Moreover, when the access point predicts that the electronic device will transmit a frame to the access point within a subsequent time interval, the access point may select the receive antenna pattern and may set an antenna pattern of the antenna to the receive antenna pattern. Next, the access point may receive the frame from the electronic device using the receive antenna pattern.

24 Claims, 5 Drawing Sheets

(51) Int. Cl.
*H04W 88/08* (2009.01)
*H04W 74/08* (2009.01)

(56) References Cited

U.S. PATENT DOCUMENTS

2004/0114535 A1* 6/2004 Hoffmann ..... H04B 7/088 370/252
2005/0075141 A1* 4/2005 Hoffmann ..... H04B 7/0408 455/562.1
2005/0185618 A1* 8/2005 Friday ..... G01S 5/0252 370/331
2005/0254513 A1 11/2005 Cave et al. ..... 370/455
2005/0285803 A1 12/2005 Lacono ..... 343/702
2006/0025178 A1* 2/2006 Tao ..... H04B 7/0617 455/562.1
2007/0026807 A1* 2/2007 Kish ..... H04B 7/0408 455/63.4
2009/0005121 A1* 1/2009 Wong ..... H01Q 3/26 455/562.1
2011/0287796 A1 11/2011 Jain et al.
2012/0063340 A1 3/2012 Waters ..... 370/252
2013/0215876 A1* 8/2013 Santos ..... H01Q 1/246 370/338
2014/0029450 A1* 1/2014 Vitek ..... H04W 16/28 370/252
2016/0219522 A1* 7/2016 Asterjadhi ..... H04W 52/0216
2016/0255664 A1* 9/2016 Li ..... H04W 76/10 370/329
2016/0309357 A1* 10/2016 Wong ..... H04L 1/0003
2018/0063794 A1* 3/2018 Sanderovich ..... H04W 74/0816

OTHER PUBLICATIONS

First Examination Report, European Patent Appl. No. 18156763.7, dated Mar. 13, 2019.
Response to First Examination Report, European Patent Appl. No. 18156763.7, dated Jul. 22, 2019.
Second Examination Report, European Patent Appl. No. 18156763.7, dated Nov. 6, 2019.
Response to Second Examination Report, European Patent Appl. No. 18156763.7, dated Mar. 4, 2020.
Examination Report, Canadian Patent Appl. No. 3,053,481, dated Sep. 21, 2020.
Fourth Examination Report, European Patent Appl. No. 18156763.7, dated Jan. 27, 2021.
Canadian Office Action, corresponding to Canadian Application No. 3,053,481, dated Jul. 30, 2021, 4 pages.
PCT Search Report & Written Opinion, Re: Application No. PCT/US18/18256, dated Apr. 30, 2018.
Extended European Search Report, Re: Application No. 18156763.7, dated Jun. 20, 2018.

* cited by examiner

DYNAMIC SELECTION OF A RECEIVE ANTENNA PATTERN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Field

The described embodiments relate to techniques for communicating information among electronic devices. In particular, the described embodiments relate to techniques for dynamically selecting an antenna pattern when receiving transmission in a network, such as a wireless local area network (WLAN).

Related Art

Many electronic devices are capable of wirelessly communicating with other electronic devices. In particular, these electronic devices can include a networking subsystem that implements a network interface for: a cellular network (UMTS, LTE, etc.), a WLAN (e.g., a wireless network such as described in the Institute of Electrical and Electronics Engineers (IEEE) 802.11 standard or Bluetooth from the Bluetooth Special Interest Group of Kirkland, Wash.), and/or another type of wireless network. For example, many electronic devices communicate with each other via WLANs using an IEEE 802.11-compatible communication protocol (which are sometimes collectively referred to as 'Wi-Fi').

In existing WLANs, an access point may increase spatial selectivity by focusing an antenna radiation pattern (which is henceforth referred to as 'an antenna pattern') during transmission using beamforming. For example, the access point may implement beamforming by combining antenna elements in a phased array. Moreover, in some existing WLANs, an access point may change a direction of a main lobe or node in the antenna pattern during transmission, so that the transmitted energy is directed towards a particular recipient, such as a station or an electronic device.

However, access points in existing WLANs usually use an omnidirectional antenna pattern when receiving frames or packets from a station or an electronic device. Because the receive antenna pattern is not directional, losses may be increased. This may adversely impact the communication performance in a WLAN and, thus, may degrade the user experience when attempting to communicate using such networks.

SUMMARY

The described embodiments relate to an access point that provides dynamic selection of a receive antenna pattern. This access point includes an interface circuit, which may be coupled to an antenna, and which communicates with at least an electronic device in a WLAN. During operation, the access point may determine the receive antenna pattern of the antenna that is used when receiving a frame from the electronic device. Then, the access point may store, in memory, information that specifies the receive antenna pattern. Moreover, when the access point predicts that the electronic device will transmit a frame to the access point within a subsequent time interval, the access point may select the receive antenna pattern and may set an antenna pattern of the antenna to the receive antenna pattern. Next, the access point may receive the frame from the electronic device using the receive antenna pattern.

Moreover, the determining of the receive antenna pattern may involve the access point: receiving frames from the electronic device that are transmitted by the electronic device, where the frames are received by the access point using different receive antenna patterns of the antenna; determining values of a performance metric based on the received frames; and selecting the receive antenna pattern from the receive antenna patterns based on the values of the performance metric. Note that primary lobes in the receive antenna patterns may have different directions.

Furthermore, the determining of the receive antenna pattern may involve the access point: transmitting frames to the electronic device using different transmit antenna patterns of the antenna; receiving, from the electronic device, values of a performance metric based on at least some of the frames that were received by the electronic device; selecting a transmit antenna pattern from the transmit antenna patterns based on the values of the performance metric; and assigning the receive antenna pattern as the transmit antenna pattern. Note that primary lobes in the transmit antenna patterns may have different directions.

Additionally, transmission by the electronic device may be predicted based on the access point: receiving an RTS frame from the electronic device and, in response, transmitting a CTS frame to the electronic device. Alternatively, the access point may transmit a trigger frame to at least the electronic device.

In some embodiments, the interface circuit is configured to communicate with a second electronic device in the WLAN, and the access point is configured to: determine a second receive antenna pattern of the antenna that is used when receiving a frame from the second electronic device. Then, the access point may store, in memory, information that specifies the second receive antenna pattern. Moreover, when the access point predicts that the second electronic device will transmit a frame to the access point within a subsequent time interval, the access point may select the second receive antenna pattern and may set an antenna pattern of the antenna to the second receive antenna pattern. Next, the access point may receive the frame from the second electronic device using the second receive antenna pattern. Thus, the receive antenna pattern and the second receive antenna pattern may, respectively, be specific to particular electronic devices in the WLAN.

Note that the receive antenna pattern may be set by coupling one or more antenna elements in the antenna to ground in order to steer the antenna pattern of the antenna in a direction. For example, the antenna elements may include reflectors.

Moreover, the access point may include: a processor; and a memory, coupled to the processor, which stores a program module that, during operation, is executed by the processor. When executed by the processor, the program module may cause the access point to perform at least some of the aforementioned operations.

Another embodiment provides a computer-readable storage medium with a program module for use with the access point. When executed by the access point, this program module causes the access point to perform at least some of the aforementioned operations.

Another embodiment provides a method, which may be performed by the access point. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An access point that performs dynamic selection of an electronic-device-specific receive antenna pattern of an antenna for use when receiving a frame from an electronic device in a WLAN is described. In particular, during operation the access point may determine the receive antenna pattern of the antenna that is used when receiving the frame from the electronic device. Then, the access point may store, in memory, information that specifies the receive antenna pattern. Moreover, when the access point predicts that the electronic device will transmit a frame to the access point within a subsequent time interval, the access point may select the receive antenna pattern and may set an antenna pattern of the antenna to the receive antenna pattern. For example, the access point may predict the electronic device is about transmit after receiving an RTS frame from the electronic device and transmitting a CTS frame to the electronic device. Alternatively, the access point may predict the electronic device is about transmit after transmitting a trigger frame to at least the electronic device. Next, the access point may receive the frame from the electronic device using the receive antenna pattern.

By customizing or tailoring the receive antenna pattern, this communication technique may increase the directionality of the antenna and, thus, may increase the receive sensitivity (e.g., by 2-3 dB). Consequently, this capability may improve the communication performance between the access point and the electronic device. For example, the communication technique may reduce the packet error rate or may increase the throughput. Moreover, the improved communication performance may improve the user experience when communicating with the access point via a WLAN.

In the discussion that follows, the electronic device and the access point communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

Figure 1:
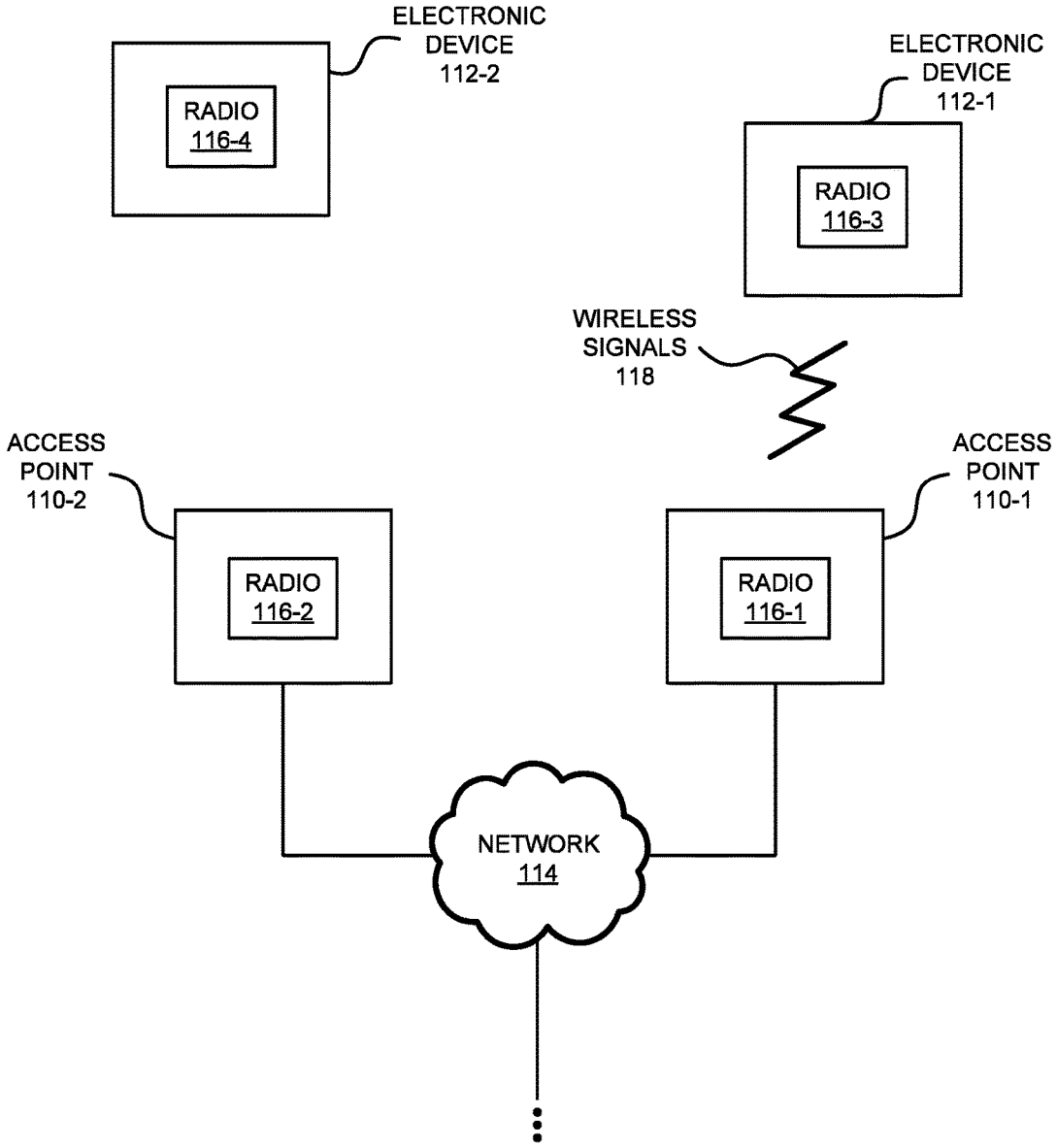
FIG. 1 is a block diagram illustrating communication among access points and electronic devices in a wireless local area network (WLAN) in accordance with an embodiment of the present disclosure.

FIG. 1 presents a block diagram illustrating an example of communication among one or more access points 110 and one or more electronic devices 112 (such as a cellular telephone) in accordance with some embodiments. In particular, access points 110 may communicate with each other using wireless and/or wired communication. Note that access points 110 may include a physical access point and/or a virtual access point that is implemented in software in an environment of an electronic device or a computer. In addition, at least some of access points 110 may communicate with electronic devices 112 using wireless communication.

The wired communication among access points 110 may occur via network 114 (such as an intra-net, a mesh network, point-to-point connections and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wireless communication among access points 110 also involves the use of dedicated connections, such as via a peer-to-peer (P2P) communication technique.

Figure 5:
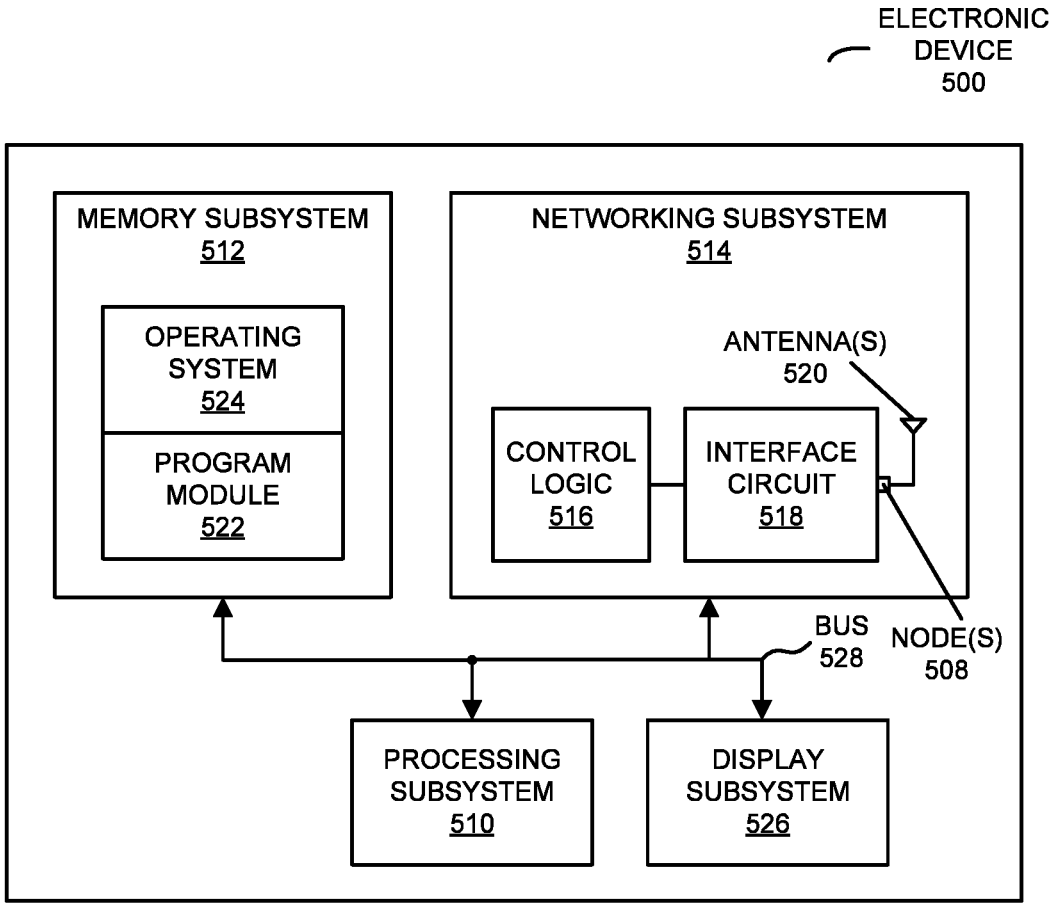
FIG. 5 is a block diagram illustrating an electronic device in accordance with an embodiment of the present disclosure.

As described further below with reference to FIG. 5, access points 110 and/or electronic devices 112 may include subsystems, such as a networking subsystem, a memory subsystem and a processor subsystem. In addition, access points 110 and electronic devices 112 may include radios 116 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 116 are shown in access points 110 and electronic devices 112, one or more of these instances may be different from the other instances of radios 116.

As can be seen in FIG. 1, wireless signals 118 (represented by a jagged line) are transmitted from radio 116-1 in access point 110-1. These wireless signals may be received by radio 116-3 in electronic device 112-1. In particular, access point 110-1 may transmit frames or packets. In turn, these frames or packets may be received by electronic device 112-1. Moreover, access point 110-1 may allow electronic device 112-1 to communicate with other electronic devices, computers and/or servers via network 114.

Note that the communication among access points 110 and/or with electronic devices 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 118 with the packet or frame; decoding/extracting the packet or frame from received wireless signals 118 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, if one of access points 110 (such as access point 110-1) uses an omnidirectional antenna pattern when receiving one or more frames or packets from one of electronic devices 112 (such as electronic device 112-1), losses may be increased, which may degrade the communication performance. As described further below with reference to FIGS. 2-4, in order to address this challenge access point 110-1 may use an electronic-device-specific receive antenna pattern to receive the one or more frames or packets. This receive antenna pattern may have increased directionality relative to an omnidirectional antenna pattern (e.g., a primary lobe of the receive antenna pattern may be directed so that the received energy from electronic device 112-1 in increased), which may increase the receive sensitivity and, thus, the communication performance.

In particular, access point 110-1 may determine the receive antenna pattern of an antenna in or associated with access point 110-1 that is used when receiving a frame or a packet from electronic device 112-1. Then, access point 110-1 may store, in memory, information that specifies the determined receive antenna pattern.

Moreover, when access point 110-1 predicts that electronic device 112-1 will transmit a frame or a packet to access point 110-1 within a subsequent time interval (such as an inter-frame space, a contention window, a network allocation vector, etc.), access point 110-1 may select the receive antenna pattern and may set an antenna pattern of the antenna to the receive antenna pattern. For example, access point 110-1 may predict the subsequent transmission by electronic device 112-1 based on access point 110-1: receiving an RTS frame from electronic device 112-1 and, in response, transmitting a CTS frame to electronic device 112-1. Alternatively, access point 110-1 may transmit a trigger frame to at least electronic device 112-1, such as the proposed trigger frame in IEEE 802.11ax. Thus, access point 110-1 may predict the subsequent transmission by electronic device 112-1 based on one or more control frames or packets and, more generally, based on virtual carrier sensing.

Next, access point 110-1 may receive the frame(s) or the packet(s) from electronic device 112-1 using the receive antenna pattern. Note that after a time reserved by the RTS frame and/or the trigger frame expires, the antenna pattern of the antenna in access point 110-1 may be reset. For example, the antenna pattern may revert to an omnidirectional antenna pattern.

Furthermore, the determining of the receive antenna pattern may involve access point 110-1: receiving frames or packets from electronic device 112-1 that are transmitted by electronic device 112-1 using a transmit antenna pattern, where the frames or packets are received by access point 110-1 using different receive antenna patterns of the antenna; determining values of a performance metric (such as throughput) based on the received frames; and selecting the receive antenna pattern from the receive antenna patterns based on the values of the performance metric. Note that primary lobes in the receive antenna patterns may have different directions.

Alternatively or additionally, the determining of the receive antenna pattern may involve access point 110-1: transmitting frames or packets to electronic device 112-1 using different transmit antenna patterns of the antenna; receiving, from electronic device 112-1, values of a performance metric (such as throughput) based on at least some of the frames or the packets that were received by electronic device 112-1; selecting a transmit antenna pattern from the transmit antenna patterns based on the values of the performance metric; and assigning the receive antenna pattern as the transmit antenna pattern. Note that primary lobes in the transmit antenna patterns may have different directions.

Thus, the receive antenna pattern may be predetermined by access point 110-1 in conjunction with electronic device 112-1, such as during a calibration mode. Note that access point 110-1 and electronic device 112-1 may repeat the calibration mode periodically or after a time interval (e.g., 1, 5, 10, 30 or 60 min) and/or as needed (e.g., when a location of electronic device 112-1 changes, when the communication performance degrades by more than 5 or 10%, etc.).

Furthermore, access point 110-1 may repeat the at least some of the aforementioned operations for electronic device 112-2. Thus, access point 110-1 may: determine another receive antenna pattern of the antenna that is used when receiving a frame or packet from electronic device 112-2; and store, in the memory, information that specifies the other receive antenna pattern. Then, when access point 110-1 predicts that electronic device 112-2 will transmit a frame or a packet to access point 110-1 within a subsequent time interval, access point 110-1 may select the other receive antenna pattern and may set the antenna pattern of the antenna to the other receive antenna pattern. Next, access point 110-1 may receive the frame or the packet from electronic device 112-2 using the other receive antenna pattern.

Thus, the receive antenna pattern and the other receive antenna pattern may, respectively, be specific to electronic devices 112-1 and 112-2 in the WLAN in FIG. 1. In this way, the communication technique may allow access point 110-1 to customize or tailor the directionality of the receive antenna pattern using predetermined information so that the communication performance with these electronic devices can be increased.

Figure 2:
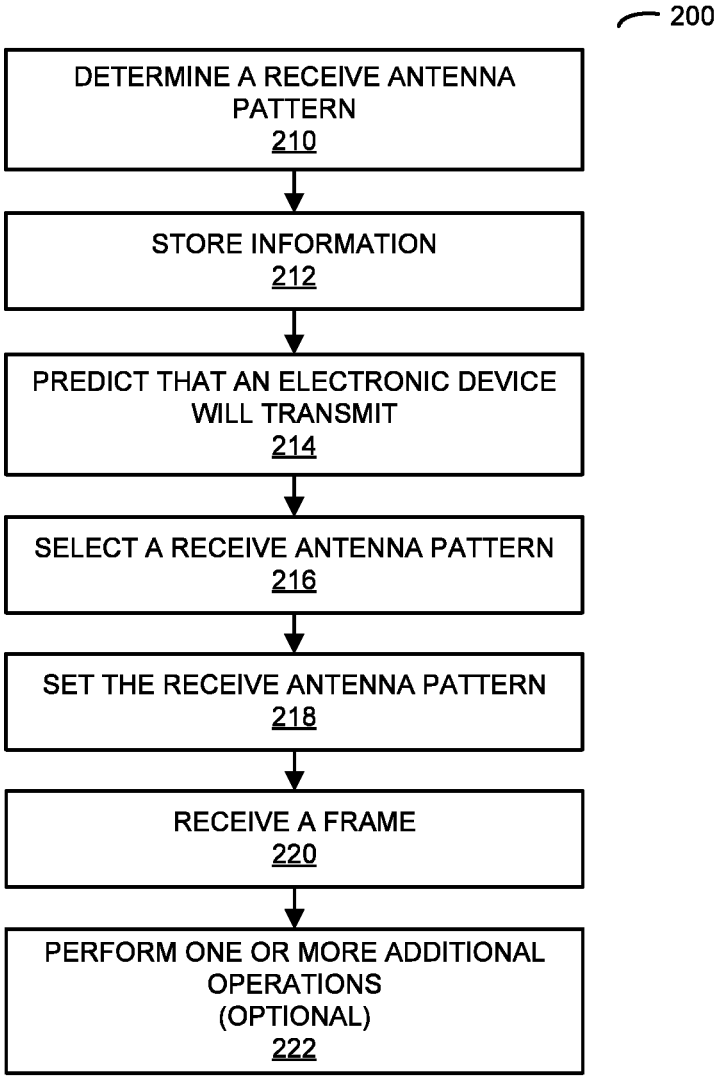
FIG. 2 is a flow diagram illustrating a method for dynamically selecting a receive antenna pattern of an antenna in an access point in FIG. 1 in accordance with an embodiment of the present disclosure.

We now describe embodiments of the method. FIG. 2 presents a flow diagram illustrating an example of a method 200 for dynamically selecting a receive antenna pattern of an antenna in an access point, such as one of access points 110 in FIG. 1. During operation, the access point may determine the receive antenna pattern (operation 210) of the antenna that is used when receiving a frame from the electronic device. Then, the access point may store, in memory, information (operation 212) that specifies the receive antenna pattern.

For example, the determining of the receive antenna pattern may involve the access point: receiving frames from the electronic device that are transmitted by the electronic device using a transmit antenna pattern, where the frames are received by the access point using different receive antenna patterns of the antenna; determining values of a performance metric based on the received frames; and selecting the receive antenna pattern from the receive antenna patterns based on the values of the performance metric. Alternatively or additionally, the determining of the receive antenna pattern may involve the access point: transmitting frames to the electronic device using different transmit antenna patterns of the antenna; receiving, from the electronic device, values of a performance metric based on at least some of the frames that were received by the electronic device; selecting a transmit antenna pattern from the transmit antenna patterns based on the values of the performance metric; and assigning the receive antenna pattern as the transmit antenna pattern.

Moreover, when the access point predicts that the electronic device will transmit a frame (operation 214) to the access point within a subsequent time interval, the access point may select the receive antenna pattern (operation 216) and may set an antenna pattern (operation 218) of the antenna to the receive antenna pattern. For example, transmission by the electronic device may be predicted based on the access point: receiving an RTS frame from the electronic device and, in response, transmitting a CTS frame to the electronic device. Alternatively or additionally, the access point may transmit a trigger frame to at least the electronic device.

Next, the access point may receive the frame (operation 220) from the electronic device using the receive antenna pattern.

In some embodiments, the access point optionally performs one or more additional operations (operation 222). For example, the access point may repeat at least some of the aforementioned operations to determine another receive antenna pattern for use when receive a frame from another electronic device. Then, information specifying the other receive antenna pattern may be stored in memory (such as in the access point).

In some embodiments of method 200 (FIG. 2), there may be additional or fewer operations. Furthermore, the order of the operations may be changed, and/or two or more operations may be combined into a single operation. For example, while the preceding embodiments illustrated method 200 using the antenna with different receive antenna patterns or different transmit antenna patterns, in some embodiments the access point may include different antennas that have different receive antenna patterns or different transmit antenna patterns.

Figure 3:
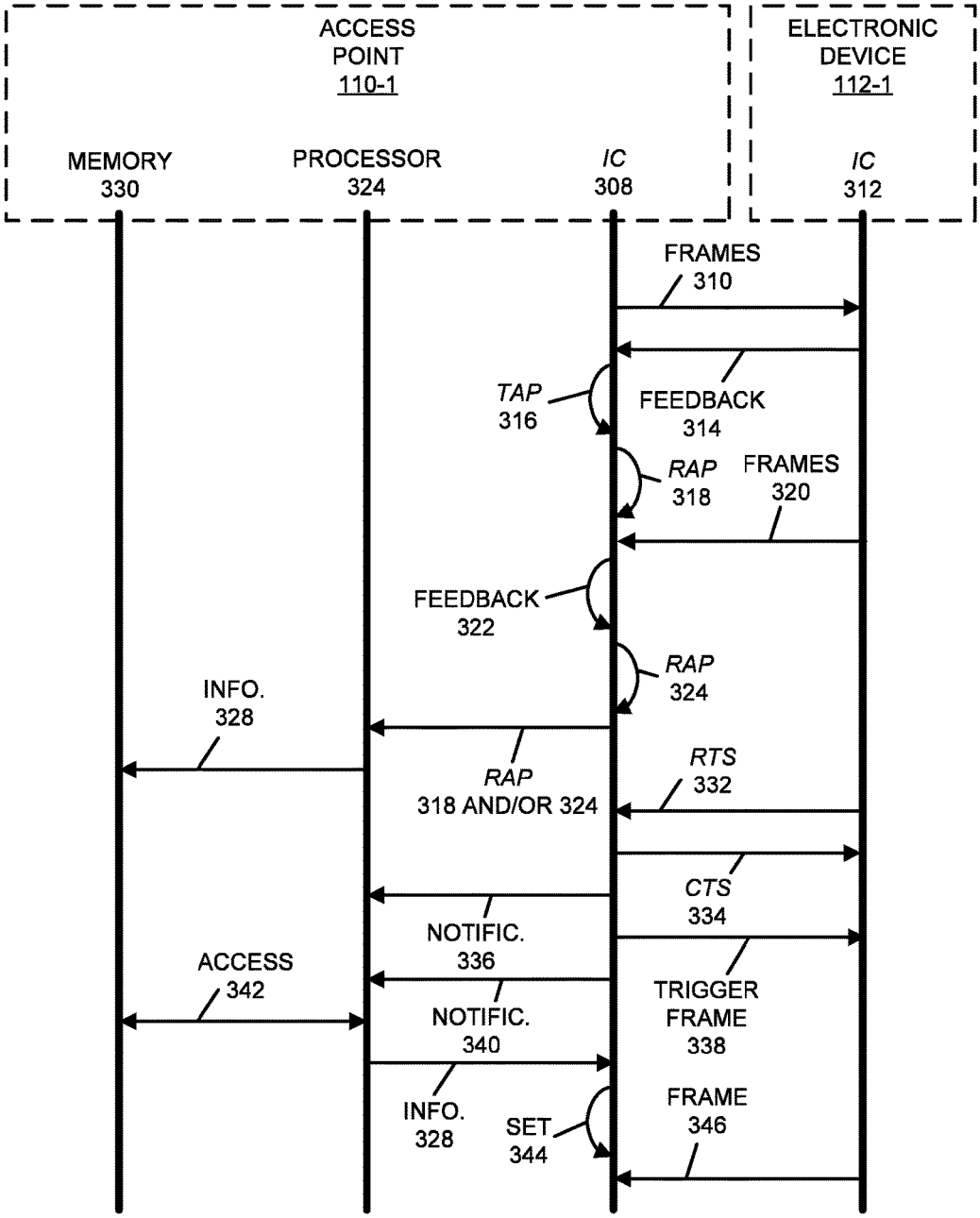
FIG. 3 is a drawing illustrating communication among the electronic devices in FIG. 1 in accordance with an embodiment of the present disclosure.

FIG. 3 presents a drawing illustrating an example of communication among access point 110-1 and electronic device 112-1. In FIG. 3, an interface circuit (IC) 308 in access point 110-1 may transmit frames 310 to electronic device 112-1. These frames may be transmitted to electronic device 112-1 using different transmit antenna patterns in an antenna in access point 110-1. After or while receiving at least some of frames 310, interface circuit 312 in electronic device 112-1 may transmit feedback 314 (such as values of a performance metric) to access point 110-1. Then, based on feedback 314 (such as values of a performance metric), interface circuit 308 may select a transmit antenna pattern (TAP) 316 from the transmit antenna patterns. Moreover, interface circuit 308 may assign receive antenna pattern (RAP) 318 as transmit antenna pattern 316.

Alternatively or additionally, interface circuit 312 may transmit frames 320 to access point 110-1. These frames may be transmitted to access point 110-1 using a transmit antenna pattern in an antenna in electronic device 112-1. Interface circuit 308 may receive at least some of frames 320 using different receive antenna patterns in the antenna in access point 110-1. Then, based on feedback 322 (such as values of a performance metric), interface circuit 308 may select receive antenna pattern 324 from the receive antenna patterns.

Note that before interface circuit 308 transmits frames 310 and/or interface circuit 312 transmits frames 320, interface circuits 308 and 312 may exchange control frames or packets (not shown) that arrange for or set up a calibration mode between access point 110-1 and electronic device 112-1.

Next, interface circuit 308 may provide receive antenna pattern 318 and/or 324 to processor 326. Processor 326 may store information 328 that specifies receive antenna pattern 318 and/or 324 in memory 330.

Moreover, access point 110-1 may predict that electronic device 112-1 will transmit a frame 346 to access point 110-1 within a subsequent time interval. For example, interface circuit 308: may receive an RTS frame 332 from interface 312; and, in response, may transmit a CTS frame 334 to interface circuit 312, and may provide notification 336 to processor 326. Alternatively or additionally, interface circuit 308 may transmit a trigger frame 338 to at least interface circuit 312, and may provide notification 340 to processor 326. Thus, in some embodiments, interface circuit 308 (such as firmware executed by interface circuit 308) may determine when electronic device 112-1 is about to transmit frame 346.

In response to notification 336 or 340, processor 326 may access 342 information 328 in memory 330 (such as by performing a look-up), and may provide information 328 to interface circuit 308. Moreover, interface circuit 308 may set 344 an antenna pattern of the antenna to the specified receive antenna pattern (such as receive antenna pattern 318 or 324). Next, interface circuit 312 may transmit frame 346 to access point 110-1, and interface circuit 308 may receive frame 346 using the selected receive antenna pattern.

Figure 4:
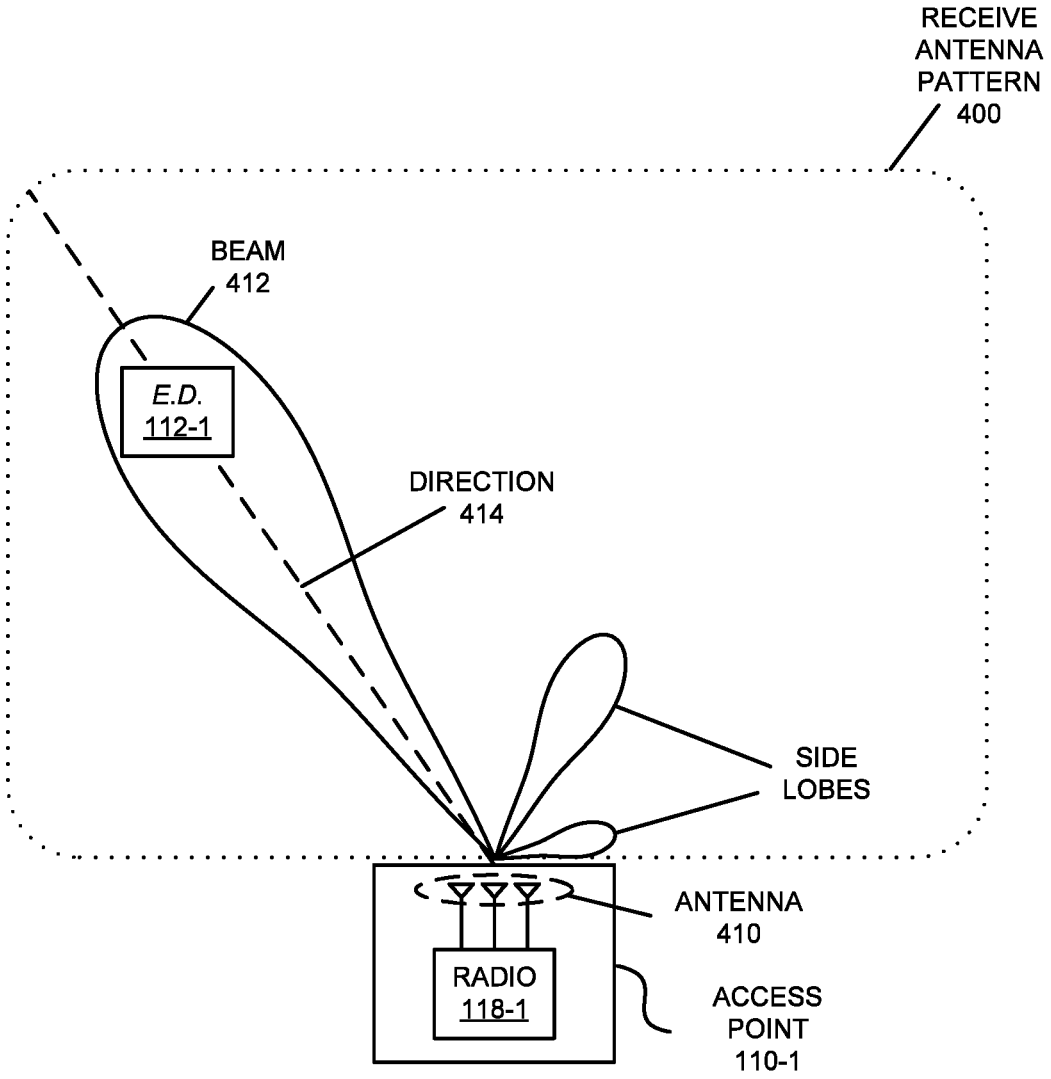
FIG. 4 is a drawing illustrating a receive antenna pattern of an antenna in an access point in FIG. 1 in accordance with an embodiment of the present disclosure.

FIG. 4 presents a drawing illustrating an example of a receive antenna pattern 400 of an antenna 410 in access point 110-1. In particular, access point 110-1 may configure antenna elements in antenna 410 to select a direction 414 of a primary beam 412 in receive antenna pattern 400. This selective directionality may improve the receive sensitivity when electronic device 112-1 transmits a frame or a packet to access point 110-1.

For example, an interface circuit in radio 116-1 may provide control signals or settings that adapt or change receive antenna pattern 400 of antenna 410. In particular, the control signals or settings may independently and selectively electrically couple pattern shapers or antenna elements (such as reflectors) in antenna 410 to ground in order to steer receive antenna pattern 400 in different directions (such as direction 414). Thus, if one or more antennas elements in antenna 410 include N antenna pattern shapers, antenna 410 may have $2^N$ different receive antenna pattern configurations. More generally, a given receive antenna pattern may include amplitudes and/or phases of signals that specify a direction of the main or primary lobe or beam 412 of the given receive antenna pattern, as well as so-called 'exclusion regions' or 'exclusion zones' (which are sometimes referred to as 'notches' or 'nulls'). Note that an exclusion zone of the given receive antenna pattern includes a low-intensity region of the given receive antenna pattern. While the intensity is not necessarily zero in the exclusion zone, it may be below a threshold, such as 3 dB or lower than the peak gain of the given antenna pattern. Thus, the given receive antenna pattern may include a local maximum (e.g., a primary beam 412) that directs gain in direction 414 of electronic device 112-1 that is of interest and/or one or more local minima that reduce gain in the direction of other electronic devices that are not of interest. More generally, receive antenna pattern 400 may have N beams at locations of electronic devices (such as electronic device 112-1) that will transmit to access point 110-1 in the subsequent time interval and/or M exclusion zones at the locations of electronic devices that will not transmit to access point 110-1 in the subsequent time interval, where N and M are integers. For example, antenna 410 may include M+1 antenna elements and there may be M exclusion zones. In this way, the given receive antenna pattern may be selected so that communication that is undesirable (such as with the other electronic devices) is avoided to reduce or eliminate adverse effects (such as interference or crosstalk) and to increase the receive sensitivity to transmissions from electronic device 112-1.

We now describe embodiments of an electronic device, which may perform at least some of the operations in the communication technique. FIG. 5 presents a block diagram illustrating an electronic device 500 in accordance with some embodiments, such as one of access points 110 or electronic devices 112. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520.) For example, networking subsystem 514 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Alternatively or additionally, at least some of the operations in the communication technique may be implemented in a physical layer, such as hardware in interface circuit 518.

Moreover, while the preceding embodiments illustrated the communication technique while an access point receives a frame or a packet from an electronic device, in some embodiments the access point may concurrently receive frames or packets from two or more electronic devices. For example, the communication protocol in a WLAN may use orthogonal frequency division multiple access (OFDMA). In these embodiments, the access point may use the average of the predetermined receive antenna patterns for the two or more electronic devices when the access point determines that the two or more electronic devices will transmit frames or packets within a subsequent time interval. Alternatively, the access point may receive the frames or packets from the two or more electronic devices by ping ponging or alternating between the predetermined receive antenna patterns for the two or more electronic devices. In these embodiments, an error-correction technique (such as an error-correction code associated with the frames or packets, redundancy, etc.) may be used to correct for any errors that occur and/or to recover information that is not received.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:

an antenna node configured to couple to an antenna; and an interface circuit, coupled to the antenna node, configured to wirelessly communicate with at least an electronic device in a wireless local area network (WLAN), wherein the access point is configured to dynamically select a receive antenna pattern of the antenna by performing operations comprising:

determining the receive antenna pattern of the antenna that is used when receiving a first frame associated with the electronic device, wherein the receive antenna pattern is electronic-device specific and has increased directionality relative to an omnidirectional antenna pattern;

storing, in memory in the access point, information that specifies the receive antenna pattern; and when the access point predicts, based at least in part on a type of control frame *which is received after the receive antenna pattern is determined*, that the electronic device will transmit [the first] *a second* frame to the access point within a subsequent time interval:

selecting the receive antenna pattern and setting an antenna pattern of the antenna to the receive antenna pattern; and receiving the [first] *second* frame associated with the electronic device using the receive antenna pattern, *wherein the second frame is different from the type of control frame, and*

*wherein the type of control frame is different from a request-to-send (RTS) frame and the type of control frame comprises a trigger frame.*

2. The access point of claim 1, wherein the determining of the receive antenna pattern involves the access point:

receiving frames associated with the electronic device, where the frames are received by the access point using different receive antenna patterns of the antenna;

determining values of a performance metric based at least in part on the received frames; and selecting the receive antenna pattern from the receive antenna patterns based at least in part on the values of the performance metric.

3. The access point of claim 1, wherein the determining of the receive antenna pattern involves the access point:

transmitting frames for the electronic device using different transmit antenna patterns of the antenna;

receiving values of a performance metric associated with the electronic device, wherein the values of the performance metric are based at least in part on at least some of the frames that were transmitted for the electronic device;

selecting a transmit antenna pattern from the transmit antenna patterns based at least in part on the values of the performance metric; and assigning the receive antenna pattern as the transmit antenna pattern.

4. The access point of claim 1, wherein the transmission by the electronic device is predicted based at least in part on the access point:

receiving [a request-to-send (RTS)] *the RTS* frame associated with the electronic device; and transmitting, in response to receiving the RTS frame, a clear-to-send (CTS) frame for the electronic device.

5. The access point of claim 1, wherein the [transmission by the electronic device is predicted based at least in part on the access point transmitting a trigger frame for at least the electronic device] *operations comprise reverting to the omnidirectional antenna pattern when a time reserved by the trigger frame expires*.

6. The access point of claim 1, wherein the interface circuit is configured to communicate with a second electronic device in the WLAN, and the access point is configured to:

determining a second receive antenna pattern of the antenna that is used when receiving a second frame associated with the second electronic device; and storing, in memory in the access point, information that specifies the second receive antenna pattern.

7. The access point of claim 6, wherein, when the access point predicts that the second electronic device will transmit the second frame to the access point within a second subsequent time interval, the access point is configured to:

select the second receive antenna pattern;

set the antenna pattern of the antenna to the second receive antenna pattern; and receive the second frame associated with the second electronic device using the second receive antenna pattern.

8. The access point of claim 1, wherein the access point comprises the antenna.

9. The access point of claim 1, wherein the antenna includes multiple antenna elements and the access point is configured to provide, to the antenna, control signals that selectively couple one or more of the antenna elements to ground to steer the antenna pattern of the antenna in a direction.

10. The access point of claim 9, wherein the antenna elements include reflectors.

11. The access point of claim 1, wherein the access point comprises:

a processor; and a memory, coupled to the processor, which stores program instructions that, when executed by the processor, the program instructions cause the access point to perform the determining and the storing.

12. A non-transitory computer-readable storage medium for use in conjunction with an access point, the computer-readable storage medium storing program instructions that, when executed by the access point, causes the access point to dynamically select a receive antenna pattern of an antenna in the access point by performing operations comprising:

determining the receive antenna pattern of the antenna that is used when receiving a first frame associated with an electronic device in a wireless local area network (WLAN), wherein the receive antenna pattern is electronic-device specific and has increased directionality relative to an omnidirectional antenna pattern;

storing, in memory in the access point, information that specifies the receive antenna pattern; and when the access point predicts, based at least in part on a type of a control frame *which is received after the receive antenna pattern is determined*, that the electronic device will transmit [the first] *a second* frame to the access point within a subsequent time interval:

selecting the receive antenna pattern and setting an antenna pattern of the antenna to the receive antenna pattern; and receiving the [first] *second* frame associated with the electronic device using the receive antenna pattern, *wherein the second frame is different from the type of control frame, and*

*wherein the type of control frame is different from a request-to-send (RTS) frame and the type of control frame comprises a trigger frame*.

13. The computer-readable storage medium of claim 12, wherein the determining of the receive antenna pattern involves the access point:

receiving frames associated with the electronic device, where the frames are received by the access point using different receive antenna patterns of the antenna;

determining values of a performance metric based at least in part on the received frames; and selecting the receive antenna pattern from the receive antenna patterns based at least in part on the values of the performance metric.

14. The computer-readable storage medium of claim 12, wherein the determining of the receive antenna pattern involves the access point:

transmitting frames for the electronic device using different transmit antenna patterns of the antenna;

receiving values of a performance metric associated with the electronic device, wherein the values of the performance metric are based at least in part on at least some of the frames that were transmitted to the electronic device;

selecting a transmit antenna pattern from the transmit antenna patterns based at least in part on the values of the performance metric; and assigning the receive antenna pattern as the transmit antenna pattern.

15. The computer-readable storage medium of claim 12, wherein the transmission by the electronic device is predicted based at least in part on the access point:

receiving [a request-to-send (RTS)] *the RTS* frame associated with the electronic device; and transmitting, in response to receiving the RTS frame, a clear-to-send (CTS) frame for the electronic device.

16. The computer-readable storage medium of claim 12, wherein the [transmission by the electronic device is predicted based at least in part on the access point transmitting a trigger frame for at least the electronic device] *operations comprise reverting to the omnidirectional antenna pattern when a time reserved by the trigger frame expires*.

17. The computer-readable storage medium of claim 12, wherein, when executed by the processor, the program module causes instructions cause the access point to perform operations comprising:

determining a second receive antenna pattern of the antenna that is used when receiving a second frame associated with the second electronic device; and storing, in memory in the access point, information that specifies the second receive antenna pattern.

18. The computer-readable storage medium of claim 17, wherein, when the program instructions are executed by the processor and when the access point predicts that the second electronic device will transmit the second frame to the access point within a second subsequent time interval, the program instructions cause the access point to perform operations comprising:

select the second receive antenna pattern;

set the antenna pattern of the antenna to the second receive antenna pattern; and receive the second frame associated with the second electronic device using the second receive antenna pattern.

19. A method for dynamically selecting a receive antenna pattern of an antenna in an access point, comprising:

by the access point:

determining the receive antenna pattern of the antenna that is used when receiving a first frame associated with an electronic device in a wireless local area network (WLAN), wherein the receive antenna pattern is electronic-device specific and has increased directionality relative to an omnidirectional antenna pattern;

storing, in memory in the access point, information that specifies the receive antenna pattern; and when the access point predicts, based at least in part on a type of a control frame *which is received after the receive antenna pattern is determined*, that the electronic device will transmit [the first] *a second* frame to the access point within a subsequent time interval:

selecting the receive antenna pattern and setting an antenna pattern of the antenna to the receive antenna pattern; and receiving the *second* frame associated with the electronic device using the receive antenna pattern, *wherein the second frame is different from the type of control frame, and*

*wherein the type of control frame is different from a request-to-send (RTS) frame and the type of control frame comprises a trigger frame*.

20. The method of claim 19, wherein the transmission by the electronic device is predicted based at least in part on the access point:

receiving [a request-to-send (RTS)] *the RTS* frame associated with the electronic device; and transmitting, in response to receiving the RTS frame, a clear-to-send (CTS) frame for the electronic device.

21. The access point of claim 1, wherein, after setting an antenna pattern of the antenna to the receive antenna pattern, the access point is configured to revert the receive antenna pattern to the omnidirectional antenna pattern after the subsequent time interval.

22. The computer-readable storage medium of claim 12, wherein the operations comprise, after setting an antenna pattern of the antenna to the receive antenna pattern, reverting the receive antenna pattern to the omnidirectional antenna pattern after the subsequent time interval.

23. The method of claim 19, wherein the method comprises, after setting an antenna pattern of the antenna to the receive antenna pattern, reverting the receive antenna pattern to the omnidirectional antenna pattern after the subsequent time interval.

*24. An electronic device, comprising:*

*an antenna node configured to couple to an antenna; and*

*an interface circuit, coupled to the antenna node, configured to wirelessly communicate with at least a second electronic device, wherein the electronic device is configured to dynamically select a receive antenna pattern of the antenna by performing operations comprising:*

*determining the receive antenna pattern of the antenna that is used when receiving a first frame associated with the second electronic device, wherein the receive antenna pattern is electronic-device specific and has increased directionality relative to an omnidirectional antenna pattern;*

*storing, in memory in the electronic device, information that specifies the receive antenna pattern; and*

*when the electronic device predicts, based at least in part on a type of control frame which is received after the receive antenna pattern is determined, that the second electronic device will transmit a second frame to the electronic device within a subsequent time interval;*

*selecting the receive antenna pattern and setting an antenna pattern of the antenna to the receive antenna pattern; and*

*receiving the second frame associated with the second electronic device using the receive antenna pattern, wherein the second frame is different from the type of control frame, and*

*wherein the type of control frame is different from a request-to-send (RTS) frame and the type of control frame comprises a trigger frame.*

* * * * *